(12) United States Patent
Gill

(10) Patent No.: US 6,198,814 B1
(45) Date of Patent: Mar. 6, 2001

(54) SYSTEM AND METHOD FOR ENTERING CALL OUTCOME RECORDS IN A COMPUTER DATABASE IN AN OUTBOUND PREDICTIVE DIALING APPLICATION

(75) Inventor: Robert Gill, Regina (CA)

(73) Assignee: Debra Ann Marie Gill, Regina (CA)

( * ) Notice: Subject to any disclaimer, the term of this patent is extended or adjusted under 35 U.S.C. 154(b) by 0 days.

(21) Appl. No.: 08/953,615

(22) Filed: Oct. 17, 1997

(51) Int. Cl.[7] .................................................. H04M 3/00
(52) U.S. Cl. ........................ 379/266; 379/265; 379/309
(58) Field of Search .................................. 379/265, 266, 379/309, 201, 142, 107, 92

(56) References Cited

U.S. PATENT DOCUMENTS

| | | |
|---|---|---|
| 5,155,736 | 10/1992 | Ono et al. . |
| 5,341,412 | 8/1994 | Ramot et al. . |
| 5,436,965 * | 7/1995 | Grossman et al. .................. 379/266 |
| 5,621,790 * | 4/1997 | Grossman et al. .................. 379/266 |

* cited by examiner

Primary Examiner—Creighton Smith
(74) Attorney, Agent, or Firm—Merchant & Gould P.C.

(57) ABSTRACT

In an outbound predictive dialing application, a fast, simple and economical system for entering brief call results in a computer database. Only one computer containing the database of telephone numbers and associated information is operatively connected to a known predictive dialer. There are standard analog telephones located at the telemarketing operator stations. Operators receive calls as in usual predictive dialing applications, and when the call is completed, press a key or keys on the telephone keypad which correspond to a certain user configured call result that is recorded in the computer database. After a number is connected to an operator once, the next time that telephone number comes up for dialing, the call result from the last time it was dialed is examined to see whether the number should be dialed again or skipped. Should the application require that information about the called person be available to the operator, such information can be displayed on a display device at the operator stations.

5 Claims, 1 Drawing Sheet

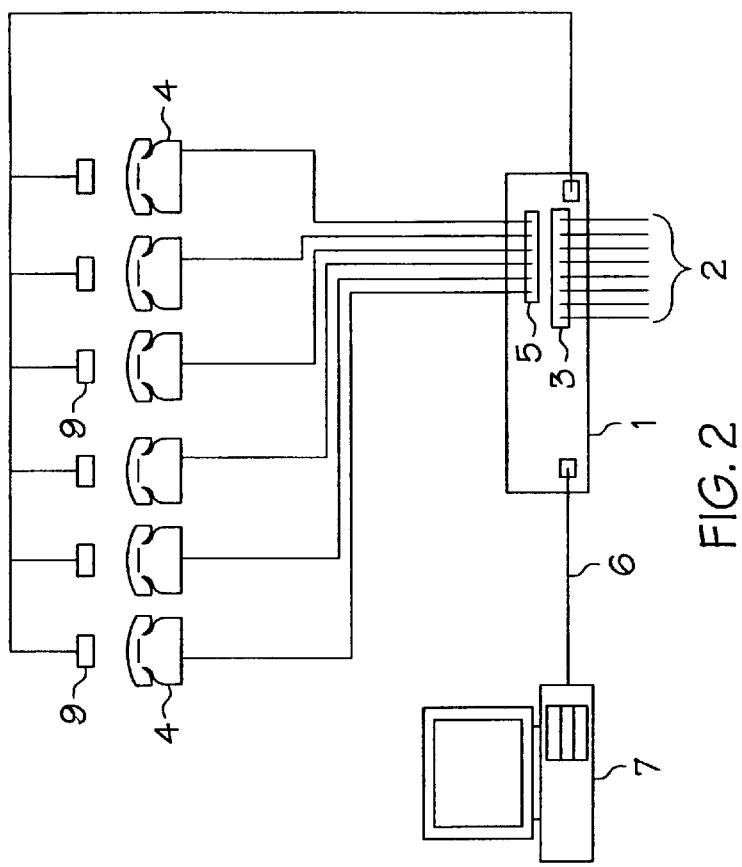
FIG. 2
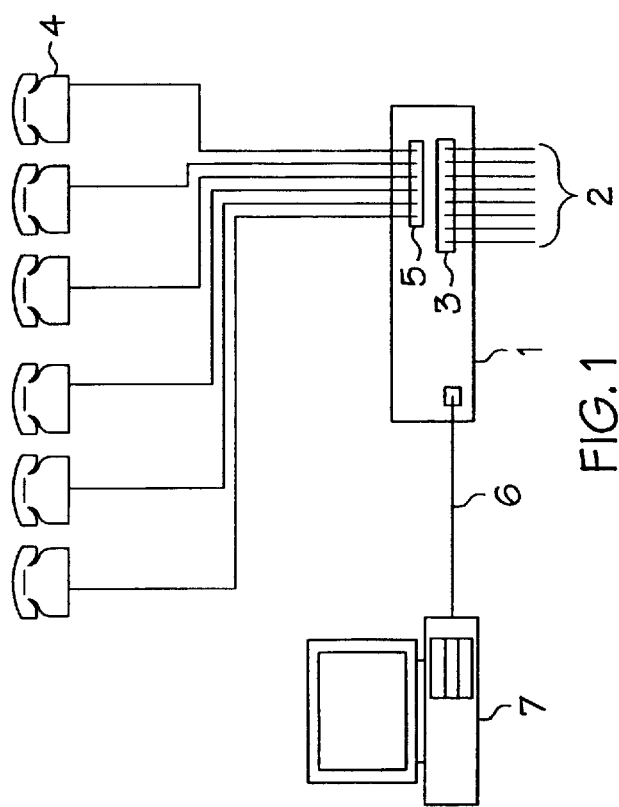
FIG. 1
FIG. 3

SYSTEM AND METHOD FOR ENTERING CALL OUTCOME RECORDS IN A COMPUTER DATABASE IN AN OUTBOUND PREDICTIVE DIALING APPLICATION

BACKGROUND OF THE INVENTION

Predictive dialing systems have greatly increased the efficiency of telemarketing operators, allowing them to spend their time talking to prospects rather than doing the mechanical tasks necessary to establish contact with the prospect. These systems automatically dial telephone numbers from a list stored in a prospect database. Busy signals and unanswered calls are recycled for dialing later, and answered calls are put in a queue to await a non-busy operator. Specified information from the database about the prospect is displayed to the non-busy operator receiving the call. Thus the operators are supplied with a steady stream of prospects on answered telephone lines along with the required information about the prospects. Various computer programs are used to attempt to match the flow of answered calls to non-busy operators, minimizing both the waiting time for prospects and the idle time for operators.

A further desired feature of such systems is the ability to record the outcome of the calls made in the prospect database. The system manager is thereby provided with the information he requires about the call results. As well, typically, once all numbers in the database have been dialed, the system starts through the list of telephone numbers again. The results recorded for the previous call to this number will indicate whether the number should be dialed again or skipped.

Present systems, wherein a computer terminal is available to each operator, allow considerable detailed information to be relayed firstly to the operator about the contact, and secondly to the computer database about the outcome of the call. In many applications however, such detailed information is not necessary, and indeed it may not be necessary that the operator have any information about the prospect he is talking to. Present systems require a computer terminal at each operator station. The prospect information is displayed on the computer screen and the outcome of the call is entered on the computer keyboard. In some systems, such as that disclosed in U.S. Pat. No. 5,341,412 to Ramot et al., control of the telephone functions is also done through the computer keyboard or mouse. Present systems also require a computer network linking all computers to the predictive dialer and the computer database. This network is a frequent cause of failure and downtime in present systems.

A more economical system, with more limited information transfer capabilities would be desirable. Such a system would also be easier to teach to new operators. As well, with a simplified information input system, it is less likely that input errors will occur and the time spent recording call results is reduced.

SUMMARY OF THE INVENTION

It is the object of the present invention to provide, in an outbound predictive dialing application, a system for entering call results into a computer database that is more economical to set-up and maintain than the presently available systems.

It is the further object of the present invention to provide, in an outbound predictive dialing application, a system for entering call results into a computer database that is simpler for the telephone operators to use than presently available systems, and that maximizes the time spent by operators in talking to people by minimizing the time spent entering call results.

It is the further object of the present invention to provide, in an outbound predictive dialing application, a system for entering call results which allows the system manager to configure which call results will indicate that the telephone number should be re-dialed and which call results will indicate that the telephone number should not be re-dialed.

It is the further object of the present invention to provide, in an outbound predictive dialing application, a system for entering call results into a computer database that does not require a computer network linking the elements of the system.

The present invention accomplishes these objects providing a system for entering call results in a computer database in an outbound predictive dialing application, said system comprising a computer, said computer containing a database of prospect records and a matrix of pre-configured call results which can be changed by the system user; a dialing controller operatively connected to a plurality of subscriber telephone lines and to the computer; and a plurality of operator telephones operatively connected to the dialing controller; wherein the computer provides to the dialing controller telephone numbers to be called and each operator telephone receives telephone call connections from the dialing controller, and wherein pressing one or more keys on an operator telephone keypad sends a signal to the computer database through the dialing controller which signal corresponds to a user configured call result, to be recorded in the computer database regarding the results of the telephone call.

The present invention further provides, in an outbound predictive dialing application, a method of entering call results in a computer database, said method comprising storing contact information in a contact database in a computer; using a predictive dialing system to dial telephone numbers from said contact database and deliver answered telephone calls to non-busy operator telephones; sending call results to the contact database by pressing at least one key on the operator telephone keypad, said key or keys corresponding to a user configured call result, and recording said call results in the contact database.

The invention further provides a system and method whereby the recorded call result indicates to the computer either that the number is to be dialed again or is not to be dialed again.

Thus the present invention provides a much simplified system which is much more economical for the purchaser to buy and set up, as there is only a standard analog telephone set at each operator station, instead of a computer terminal. Only one computer is needed, with the keyboard used only by the system manager to access and control the database, and configure the call results to be recorded for a given number pressed on the operator telephone keypads. The system manager can set up the system so that any call result indicated by an entry on the operator telephone keypads will also indicate either that the telephone number should be re-dialed or that the number should not be re-dialed. The predictive dialer itself can be any known dialer, with an appropriate interface allowing transfer of the signals from the operator telephones to the computer database to be recorded there in relation to the prospect called.

The complex software necessary to link computers in a network is also eliminated, along with the associated expense and cause of possible failure and downtime. The only person with access to the computer is the system manager, also reducing the chance of error and downtime.

The present invention is much simpler to use, allowing for faster training of operators, who need to have no computer or keyboard skills. There may be as few as 3 or 4 call results which could each correspond to a different number on the telephone keypad. For example, the numbers on the operator telephone could correspond to the following desired call results:

1- NO, call again;
2- YES, do not call again;
3- Answering machine, call again;
4- Disconnected phone, do not call again.

Alternatively, in the above example, the user could configure the system so that a "NO" result (number 1) will not be called again, or so that a "YES" result (number 2) will be called again.

It is easy to contemplate further combinations of numbers and results that could be accommodated by the system, up to 12 call results using the 12 keys on the telephone keypad. As the entry of call outcomes is done by simply pressing one key on the telephone keypad, the operator is able to quickly proceed to the next call, allowing the operator to maximize contact time with called persons. The system could also be configured to allow for a call result represented by two or more key strokes, thereby increasing the available information that can be entered in the database.

In many applications, such as broad based sales campaigns where the object is simply to connect the operator to a live person, it is not necessary that the operator have any information about the prospect on the telephone line. Where such information is desired for the operator, a small display terminal could be provided to the operator to display the desired information such as name and address, or whatever else was desired. The information is transferred to the display terminal via a further interface between the dialer and the computer database,

BRIEF DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

FIG. 1 is a schematic diagram of an embodiment of the invention with standard RJ 45 telephones as operator telephones;

FIG. 2 is a schematic diagram of an embodiment of the invention of FIG. 1 further including an LED display device at each operator station; and FIG. 3 is a diagram of a standard telephone keypad.

DETAILED DESCRIPTION OF THE PREFERRED EMBODIMENT

The above specification, examples and data provide a complete description of the manufacture and use of the composition of the invention. Since many embodiments of the invention can be made without departing from the spirit and scope of the invention, the invention resides in the claims hereinafter appended.

The invention is a system for use in an outbound predictive dialing application to enter call results in a computer database, said system comprising a dialing controller operatively connected to a plurality of subscriber telephone lines and to a computer, said computer containing a database of prospect records; a plurality of operator telephones operatively connected to the dialing controller such that each operator telephone can receive telephone call connections from the dialing controller, and further such that pressing at least one key on an operator telephone keypad sends a signal to the computer database via the dialing controller which signal corresponds to a preconfigured call result to be recorded in the computer database; said operative connection between the computer and the dialing controller allowing the computer to provide to the dialing controller the telephone numbers to be called, and allowing the dialing controller to send to the computer the signals received from the operator telephones regarding the results of each telephone call.

FIG. 1 shows one preferred embodiment of the invention. A known predictive dialer 1 is connected to eight subscriber telephone lines 2 at subscriber line ports 3. Six standard telephones, the operator telephones 4, are connected to the predictive dialer 1 at operator telephone ports 5. Cable 6 connects predictive dialer 1 to computer 7 containing the contact database which database includes telephone numbers of the persons to be called. The predictive dialer 1 receives a list of telephone numbers from the database in the computer 7, and dials telephone numbers from the list through subscriber telephone lines 2. The predictive dialer 1 rejects busy and unanswered calls, and sends completed calls to a non-busy telephone operator, who then talks to the person on the line. The predictive dialer 1 notifies the computer that a certain operator has a call in progress with a certain person. When the call is completed, the operator presses a number on the operator telephone keypad 8, sending a signal to the predictive dialer 1, which in turn sends the signal to the computer 7. The computer 7 reads the signal, compares it to the pre-configured results corresponding to different keys on the operator telephone keypad 8, and enters the result in the computer database for the person called.

In one embodiment, four numbers on the keypad 8 are configured to correspond to the results of a call seeking to sell an item. #1 is configured to mean that the result is no sale; #2 is configured to mean that the result is a sale; #3 is configured to mean that the answer was by an answering machine or message manager and that the number should be called again; #4 is configured to mean that the telephone number has been disconnected and should not be re-dialed. It is contemplated that the system could be configured so that pressing two or more keys would be required to generate a signal to the computer, thereby increasing the variety of call result that could be recorded in the database.

FIG. 2 shows an embodiment of the invention further including LCD display devices 9 at each telephone operator station. In this embodiment, when the predictive dialer 1 notifies the computer 7 that a certain operator has a call in progress with a certain person, the computer 7 sends selected information about the person being called to the predictive dialer 1 which in turn transfers the information-nation to the appropriate LCD display device 9 so that the operator can see the information.

Thus it can be seen that the invention accomplishes all of its stated objectives. The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

I claim:

1. A system for entering call results in a computer database in an outbound predictive dialing application, said system comprising:

a computer, said computer containing a database of prospect records and a matrix of pre-figured call results which can be changed by the system user;

a dialing controller operatively connected to a plurality of subscriber telephone lines;

a cable connected between the computer and the dialing controller; and a plurality of operator telephones operatively connected to the dialing controller;

wherein the computer provides to the dialing controller telephone numbers to be called and each operator telephone receives telephone call connections from the dialing controller, and where in pressing one or more keys on an operator telephone keypad sends a signal to the computer database through the dialing controller which signal corresponds to a user configured call result, to be recorded in the computer database regarding the results of the telephone call.

2. The system of claim 1 wherein the recorded call result indicates to the computer either that the number is to be dialed again or is not to be dialed again.

3. The system of claim 2 wherein the operator telephones are any standard analog telephone set.

4. The system of claim 3 wherein the number of operator telephones is less than the number of subscriber telephone lines connected to the dialing controller.

5. The system of claim 1 further comprising a display device located in proximity to each operator telephone, the display device operatively connected through the dialing controller to the computer database such that information about the current call connection is displayed to the operator.

* * * * *